United States Patent
Pan et al.

(10) Patent No.: US 12,397,862 B1
(45) Date of Patent: Aug. 26, 2025

(54) CARRIER CONTROL MODULE

(71) Applicant: PRIMAX ELECTRONICS LTD., Taipei (TW)

(72) Inventors: Yung-Tai Pan, Taipei (TW); Chang-Ming Huang, Taipei (TW); Wen-Pin Tsao, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 18/931,147

(22) Filed: Oct. 30, 2024

(30) Foreign Application Priority Data

Oct. 9, 2024 (TW) .................................. 113138359

(51) Int. Cl.
*B62D 24/04* (2006.01)

(52) U.S. Cl.
CPC .................................... *B62D 24/04* (2013.01)

(58) Field of Classification Search
CPC ............................... B25J 9/1664; B62D 24/04
USPC ......................................................... 108/1, 7
See application file for complete search history.

(56) References Cited

U.S. PATENT DOCUMENTS

| | | | | |
|---|---|---|---|---|
| 7,083,013 | B2* | 8/2006 | Chuan | B60N 2/0244 180/41 |
| 7,464,997 | B2* | 12/2008 | Longley | B62D 55/10 305/128 |
| 8,028,783 | B2* | 10/2011 | Rust | B62D 33/067 280/6.154 |
| 10,618,675 | B2* | 4/2020 | Conyers | B60K 1/02 |
| 11,097,583 | B2* | 8/2021 | Rohde | B60G 5/00 |
| 11,873,020 | B2* | 1/2024 | Kalinowski | B62B 5/063 |
| 12,065,204 | B2* | 8/2024 | Hellholm | B60G 17/0165 |
| 2009/0118913 | A1* | 5/2009 | O'Halloran | E02F 9/028 701/50 |
| 2014/0268383 | A1* | 9/2014 | Bullard | G02B 7/182 108/1 |
| 2024/0034117 | A1* | 2/2024 | Panigrahi | B60P 1/006 |
| 2024/0384831 | A1* | 11/2024 | Gu | A47G 23/02 |

* cited by examiner

*Primary Examiner* — Paul N Dickson
*Assistant Examiner* — Tiffany L Webb
(74) *Attorney, Agent, or Firm* — WPAT, PC

(57) ABSTRACT

A carrier control module includes a carrier and an actuating mechanism. The carrier is configured to couple to a mobile vehicle and has a leveling sensor. The actuating mechanism is disposed beneath the carrier and connected or coupled to a first region and a second region of the carrier, in which the leveling sensor is configured to sense a tilt angle of the carrier, and when the tilt angle of the carrier is non-zero or reaches a non-zero preset value, the actuating mechanism is actuated to adjust an attitude of the carrier so that the tilt angle of the carrier becomes smaller or zero.

2 Claims, 5 Drawing Sheets

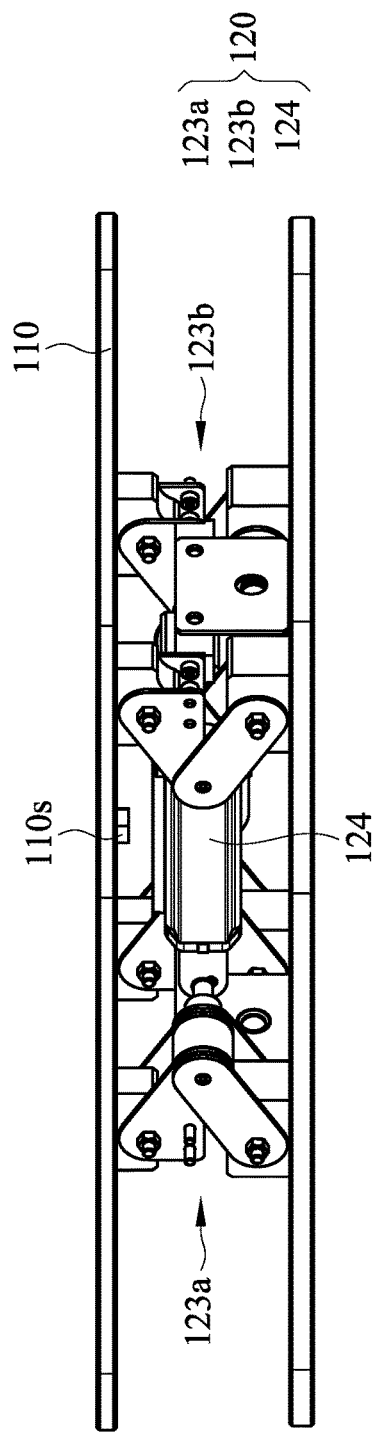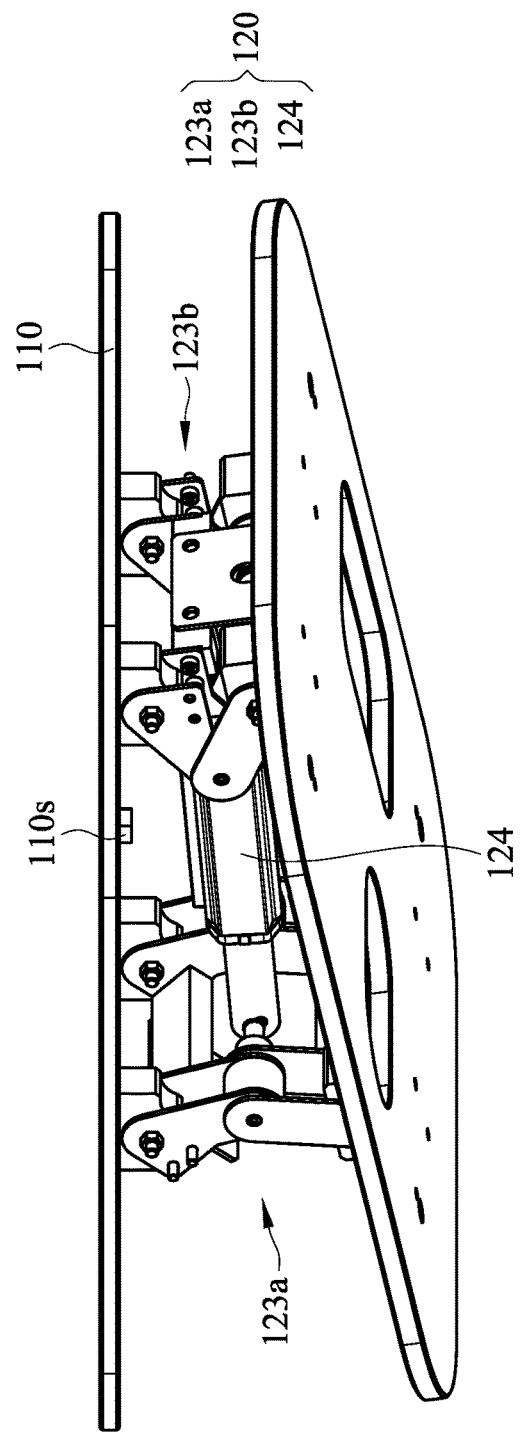

CARRIER CONTROL MODULE

FIELD OF THE INVENTION

The present invention relates to a carrier control module, and in particular to a carrier control module that can adjust an attitude of the carrier so that a tilt angle becomes smaller or zero.

BACKGROUND OF THE INVENTION

When a mobile vehicle carrying objects travels uphill or downhill, the objects may tip over because their center of gravity shifts. Therefore, a novel control module is currently needed to solve the above problem.

SUMMARY OF THE INVENTION

The present invention provides a carrier control module, which includes a carrier and an actuating mechanism. The carrier is configured to couple to a mobile vehicle and has a leveling sensor. The actuating mechanism is disposed beneath the carrier and connected or coupled to a first region and a second region of the carrier, in which the leveling sensor is configured to sense a tilt angle of the carrier, and when the tilt angle of the carrier is non-zero or reaches a non-zero preset value, the actuating mechanism is actuated to adjust an attitude of the carrier so that the tilt angle of the carrier becomes smaller or zero.

In some embodiments of the present invention, the carrier has a first portion and a second portion pivotally connected together, and the second portion partially or completely surrounds the first portion, and the first region and the second region of the carrier are respectively located at the first portion and the second portion, and the first portion has a first pivot end that is opposite to the first region, and the second portion has a second pivot end and a third pivot end opposite to each other, and the second region is between the second pivot end and the third pivot end, and the first pivot end and the second pivot end are pivotally connected together, and the first region is between the second region and the third pivot end, and the actuating mechanism includes a first actuator and a second actuator respectively connected or coupled to the first region and the second region.

In some embodiments of the present invention, the first pivot end and the first region are respectively located at opposite ends of the first portion, and the second pivot end and the third pivot end are respectively located at opposite ends of the second portion.

In some embodiments of the present invention, the carrier further includes a connecting portion across a portion of the first portion and connected to the second region, and the second actuator is connected or coupled to the second region through the connecting portion.

In some embodiments of the present invention, the first actuator is pivotally connected to the first region, and the second actuator is pivotally connected to the connecting portion.

In some embodiments of the present invention, the first actuator is configured to lift the first region when actuated, and the second actuator is configured to lift the second region and the portion of the first portion when actuated.

In some embodiments of the present invention, the third pivot end is configured to be pivotally connected the mobile vehicle, and the first pivot end and the second pivot end are not pivotally connected to the mobile vehicle.

In some embodiments of the present invention, the first pivot end and the second pivot end are respectively located at an edge of the first portion and an edge of the second portion.

In some embodiments of the present invention, the actuating mechanism is actuated to restore the attitude of the carrier in a real-time adjustment manner.

In some embodiments of the present invention, the actuating mechanism includes: two locking/unlocking assemblies, respectively connected or coupled to the first region and the second region of the carrier; and an actuator, having two ends respectively pivotally connected to the two locking/unlocking assemblies, in which when the tilt angle of the carrier is non-zero or reaches the non-zero preset value, one of the two locking/unlocking assemblies is in an unlocked state, and the other thereof is in a locked state, and the actuator is pushed toward the one of the two locking/unlocking assemblies to lift the first region or the second region to which it is connected or coupled.

In some embodiments of the present invention, the actuating mechanism includes: a first rotating shaft, configured to pivoted or unpivoted to a first pivot hole of one end of the carrier; a second rotating shaft, configured to pivoted or unpivoted to a second pivot hole of another end of the carrier opposite to the end; a V-shaped piece, between the first rotating shaft and the second rotating shaft, and two ends of the V-shaped piece being in contact with the first region and the second region of the carrier, respectively; and an actuator, pivotally connected to the V-shaped piece, in which when the tilt angle of the carrier is non-zero or reaches the non-zero preset value, one of the first and second rotating shafts is in a pivoted state, and the other thereof is in an unpivoted state, and the actuator rotates the V-shaped piece to drive the carrier to rotate along the one of the first and second rotating shafts.

BRIEF DESCRIPTION OF THE DRAWINGS

Aspects of the present invention are best understood from the following embodiments, read in conjunction with accompanying drawings. However, it should be understood that in accordance with common practice in the industry, various features have not necessarily been drawn to scale. Indeed, shapes of the various features may be suitably adjusted for clarity, and dimensions of the various features may be arbitrarily increased or decreased.

FIG. 5 is a perspective view of a carrier control module according to another embodiment of the present invention.

FIG. 6 is a perspective view of the carrier control module in FIG. 5 after operation.

DETAILED DESCRIPTION OF THE PREFERRED EMBODIMENT

Figure 1:
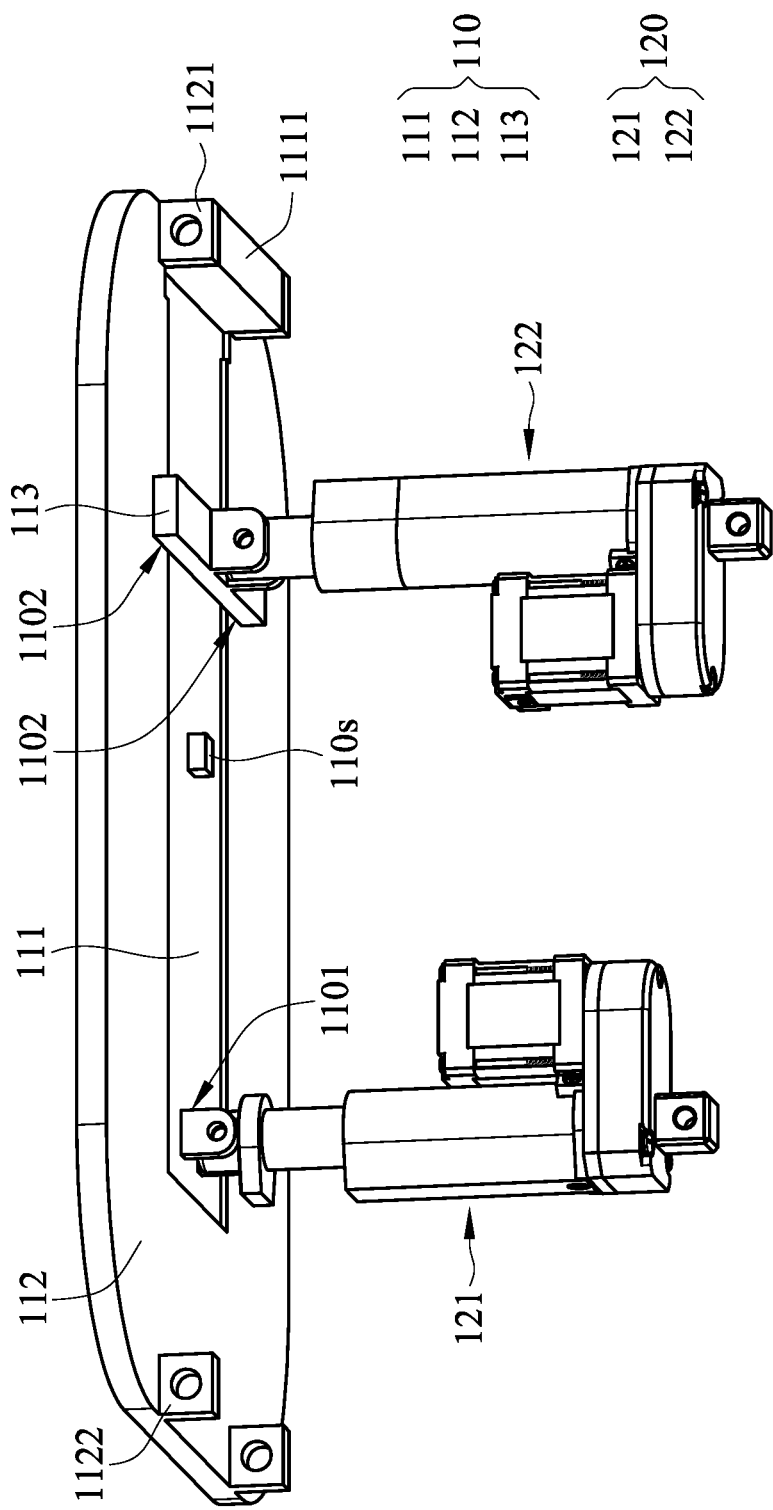
FIG. 1 is a perspective view of a carrier control module according to an embodiment of the present invention.

The advantages and features of the present invention and the method for achieving the same will be described in more detail with reference to exemplary embodiments and accompanying drawings to make it easier to understand. However, the present invention can be implemented in different forms and should not be construed as being limited to the embodiments set forth herein. On the contrary, for those skilled in the art, the provided embodiments will make this disclosure more thorough, comprehensive and complete to convey the scope of the present invention.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180°, the relationship between the one element and the other element may change from "beneath" to "over." The spatially relative descriptions used herein should be interpreted the same.

As mentioned in the prior art, when a mobile vehicle carrying objects travels uphill or downhill, the objects may tip over because their center of gravity shifts. The inventor found that taking autonomous mobile robots (AMRs) as an example, since most of them have an integrated fixed structure and cannot adjust their posture autonomously, when traveling uphill or downhill, it is easy to cause the robot and the objects it carries to tip over. Accordingly, the present invention provides a carrier control module, which includes a carrier and an actuating mechanism. The carrier has a leveling sensor and is configured to couple to a mobile vehicle (which is located beneath the carrier). The mobile vehicle can be, for example, an autonomous mobile vehicle, such as a robot chassis, an automated guided vehicle (AGV), etc. The leveling sensor can sense a tilt angle of the carrier. When the tilt angle of the carrier is non-zero or reaches a non-zero preset value, the actuating mechanism is actuated to adjust an attitude of the carrier (e.g., restoring the attitude of the carrier in a real-time adjustment manner), so that the tilt angle of the carrier becomes smaller or zero to effectively prevent the carrier and/or the objects carried above the carrier from tipping. Various embodiments of the carrier control module of the present invention will be described in detail below.

Figure 2:
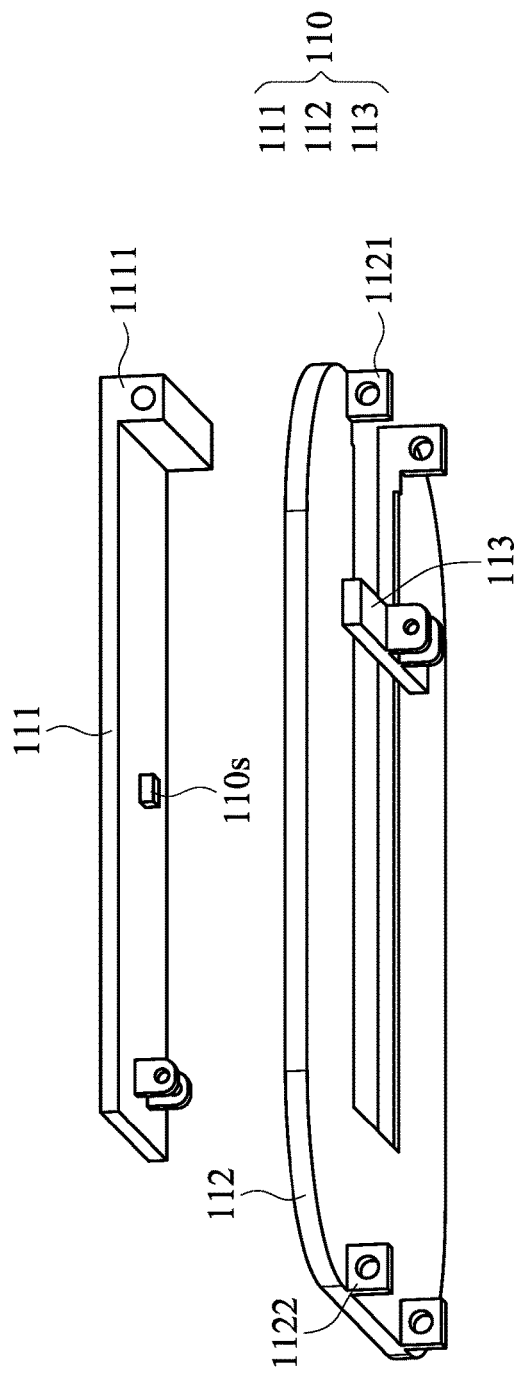
FIG. 2 is an exploded view of a carrier of FIG. 1.
Figure 3:
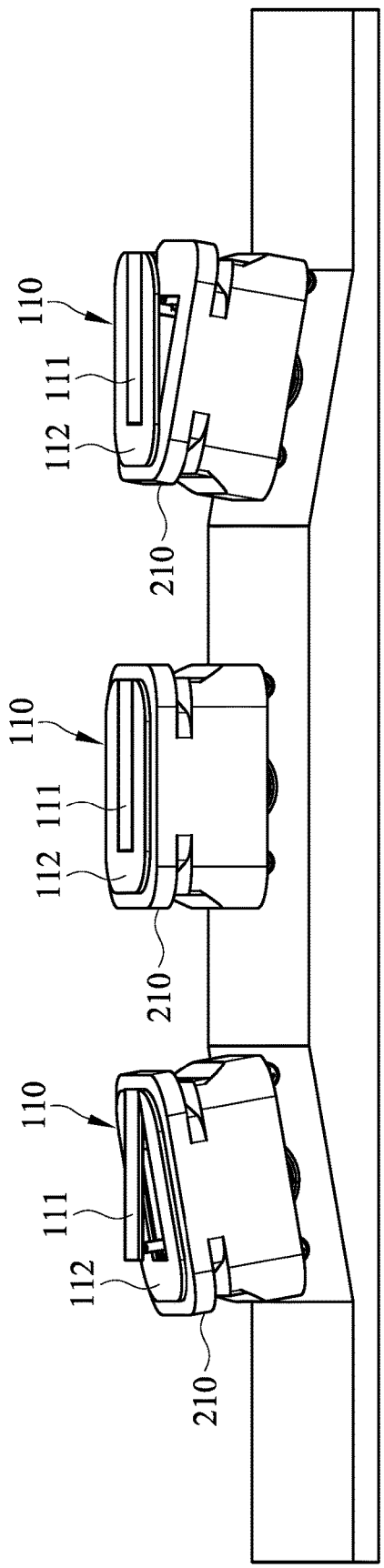
FIG. 3 is a perspective view of a carrier control module and a mobile vehicle operating on terrain with different slopes according to an embodiment of the present invention.

FIG. 1 is a perspective view of a carrier control module according to an embodiment of the present invention. FIG. 2 is an exploded view of a carrier of FIG. 1. FIG. 3 is a perspective view of a carrier control module and a mobile vehicle operating on terrain with different slopes according to an embodiment of the present invention. As shown in FIGS. 1 and 2, the carrier control module includes a carrier 110 and an actuating mechanism 120.

As shown in FIG. 3, the carrier 110 is configured to couple to the mobile vehicle 210 located therebeneath. As shown in FIGS. 1 and 2, the carrier 110 has a leveling sensor 110s. In some embodiments, the leveling sensor 110s is disposed on a lower surface of the carrier 110 (as shown in FIG. 1) or embedded in the carrier 110 (not shown).

As shown in FIG. 1, the actuating mechanism 120 is disposed beneath the carrier 110 and is connected or coupled to a first region 1101 and a second region 1102 of the carrier 110. The leveling sensor 110s is configured to sense a tilt angle of the carrier 110. When the tilt angle of the carrier 110 is non-zero or reaches a non-zero preset value, the actuating mechanism 120 is actuated to adjust an attitude of the carrier 110 so that the tilt angle of the carrier 110 becomes smaller or zero. In some embodiments, the actuating mechanism 120 is actuated to restore the attitude of the carrier 110 in a real-time adjustment manner. In some embodiments, the carrier control module further includes a controller (not shown), which is configured to receive the tilt angle of the carrier 110 sensed by the leveling sensor 110s, and when the tilt angle of the carrier 110 is non-zero or reaches the non-zero preset value, the controller drives the actuating mechanism 120 to operate to adjust the attitude of the carrier 110.

In some embodiments, as shown in FIGS. 1 and 2, the carrier 110 has a first portion 111 and a second portion 112 that are pivotally connected together. The second portion 112 partially or completely surrounds the first portion 111. In some embodiments, the second portion 112 is U-shaped (as shown in FIG. 2) or rectangular frame-shaped (not shown). In some embodiments, a thickness of first portion 111 is less than a thickness of second portion 112.

In some embodiments, as shown in FIG. 1, the first region 1101 and the second region 1102 of the carrier 110 are located at the first portion 111 and the second portion 112, respectively, and the first portion 111 has a first pivot end 1111 opposite to the first region 1101. The second portion 112 has a second pivot end 1121 and a third pivot end 1122 that are opposite to each other. The second region 1102 is between the second pivot end 1121 and the third pivot end 1122. The first pivot end 1111 and the second pivot end 1121 are pivotally connected together, and the first region 1101 is between the second region 1102 and the third pivot end 1122.

In some embodiments, as shown in FIG. 1, the actuating mechanism 120 includes a first actuator 121 and a second actuator 122, which are connected or coupled to the first region 1101 and the second region 1102, respectively. In some embodiments, as shown in FIGS. 1 to 3, the third pivot end 1122 is configured to be pivotally connected to the mobile vehicle 210, and the first pivot end 1111 and the second pivot end 1121 are not pivotally connected to the mobile vehicle 210.

In some embodiments, as shown in FIG. 1, the carrier 110 further includes a connecting portion 113, which is across a portion of the first portion 111 and is connected to the second region 1102, and the second actuator 122 is connected or coupled to the second region 1102 through the connecting portion 113. In some embodiments, the first actuator 121 is pivotally connected to the first region 1101, and the second actuator 122 is pivotally connected to the connection portion 113.

In some embodiments, the leveling sensor 110s is disposed on a lower surface of the first portion 111 (as shown in FIGS. 1 and 2) or embedded in the first portion 111 (not shown). In some embodiments, referring to FIGS. 1 to 3, assuming that a forward direction of the mobile vehicle 210 is left, when the mobile vehicle 210 encounters a downhill terrain, the first actuator 121 is actuated to act, and the first actuator 121 is configured to rotate the first portion 111 along the first pivot end 1111 to lift the first region 1101 when it is actuated, so that the tilt angle of the first portion 111 becomes smaller or zero (as shown on the left side of FIG. 3). As such, the objects on the first portion 111 of the carrier 110 will not tip over. When the mobile vehicle 210 encounters an uphill terrain, the second actuator 122 is actuated to act, and the second actuator 122 is configured to rotate the second portion 112 along the third pivot end 1122 to lift the second region 1102 and the portion of the first portion 111 when it is actuated, so that the tilt angle of the carrier 110 (including the first portion 111 and the second portion 112) becomes smaller or zero (as shown on the right side of FIG. 3). As such, the objects on the first portion 111 of the carrier 110 will not tip over.

In some embodiments, as shown in FIG. 1, the first pivot end 1111 and the first region 1101 are located at opposite ends of the first portion 111, and the second pivot end 1121 and the third pivot end 1122 are respectively located at opposite ends of the second portion 112. In some embodiments, the first pivot end 1111 and the second pivot end 1121 are respectively located at an edge of the first portion 111 and an edge of the second portion 112. As such, when the first portion 111 is rotated along the first pivot end 1111 to lift the first region 1101 (as shown on the left side of FIG. 3), objects (not shown) beyond an edge of the carrier 110 are less likely to touch the mobile vehicle 210. However, the present invention is not limited thereto. In other embodiments, the first pivot end and the second pivot end may not be located at the edge of the first portion 111 and the edge of the second portion 112.

Figure 4:
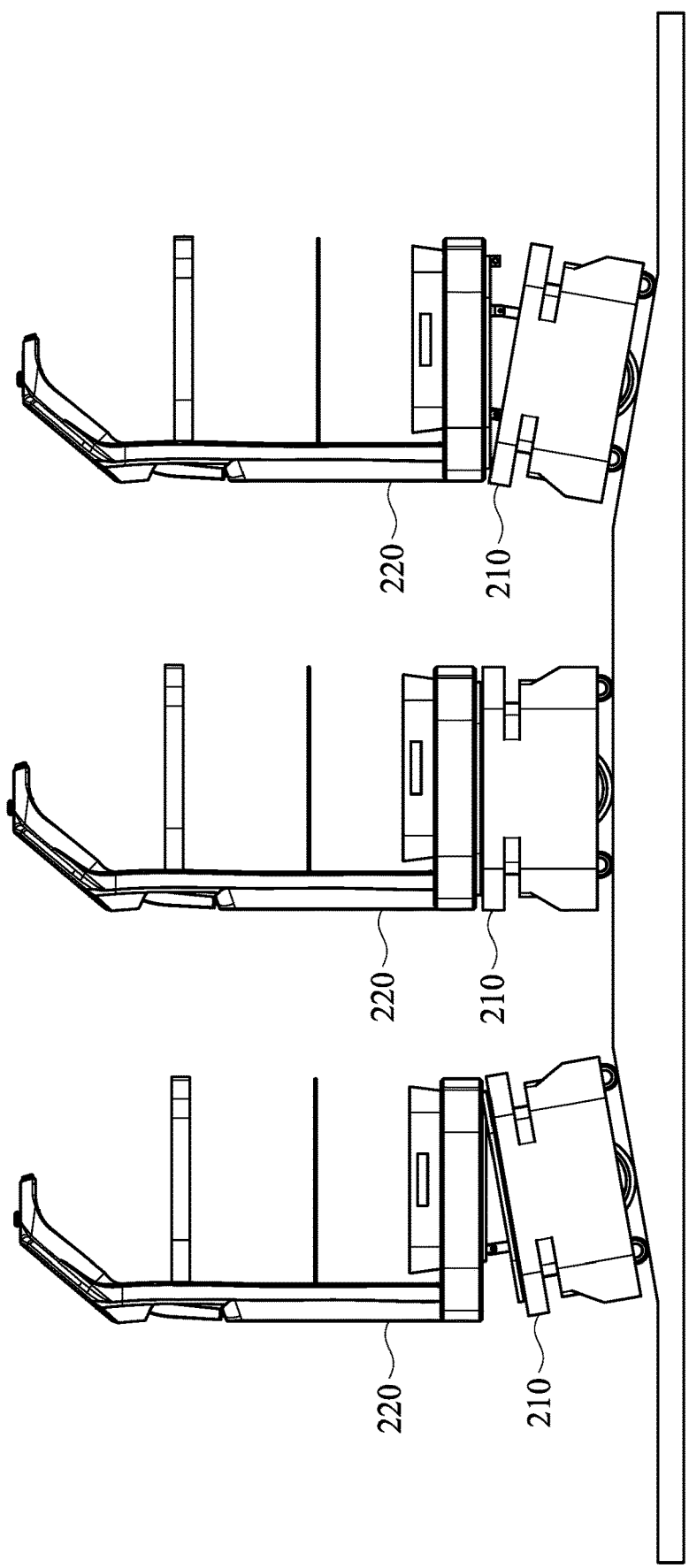
FIG. 4 is a side view of a carrier control module, a mobile vehicle and a base operating on terrain with different slopes according to an embodiment of the present invention.

FIG. 4 is a side view of a carrier control module, a mobile vehicle and a base operating on terrain with different slopes according to an embodiment of the present invention. As shown in FIG. 4, the carrier 110 is configured to carry a base 220, which may be, for example, a base for carrying objects. In some embodiments, as shown in FIGS. 3 and 4, the base 220 is only fixed on the first portion 111 but not fixed on the second portion 112.

FIG. 5 is a perspective view of a carrier control module according to another embodiment of the present invention. FIG. 6 is a perspective view of the carrier control module in FIG. 5 after operation. As shown in FIGS. 5 and 6, the actuating mechanism includes two locking/unlocking assemblies 123a, 123b and an actuator 124.

The two locking/unlocking assemblies 123a and 123b are respectively connected or coupled to the first region (not labeled) and the second region (not labeled) of the carrier 110. Two ends of the actuator 124 are pivotally connected to the two locking/unlocking assemblies 123a, 123b, respectively. When the tilt angle of the carrier 110 is non-zero or reaches the non-zero preset value, one of the two locking/unlocking assemblies 123a and 123b in an unlocked state, and the other thereof is in a locked state, and the actuator 124 is pushed toward the one of the two locking/unlocking assemblies (i.e., the locking/unlocking assembly in the unlocked state) to lift the first region or the second region to which it is connected or coupled. For example, please refer to FIGS. 5 and 6. When the tilt angle of the carrier 110 is non-zero or reaches the non-zero preset value (not shown), the lock/unlock assembly 123a is in an unlocked state, and the lock/unlock assembly 123b is in a locked state, and the actuator 124 is pushed toward the locking/unlocking assembly 123a to lift the first region or the second region to which it is connected or coupled so as to reduce the tilt angle of the carrier 110 or make it horizontal (as shown in FIG. 6).

In some embodiments, each of the locking/unlocking assemblies 123a and 123b is a pivot assembly, which has two sets of pivot components (not labeled), a pivot shaft (not labeled) pivoted between the two sets of the pivot components, and a stopper with a hole (not labeled); two ends of each set of the pivot components are respectively pivotally connected to a carrier 110 and a bottom part (not labeled), and the bottom part may be fixedly connected to a mobile vehicle (e.g., the mobile vehicle 210 shown in FIG. 3), and the pivot shaft is further pivotally connected to one end of the actuator 124. In some embodiments, when a latch (not shown) is inserted into the hole of the stopper of the locking/unlocking assembly 123a or 123b, it is locked; when the latch exits the hole of the stopper of the locking/unlocking assembly 123a or 123b, it is unlocked.

Figure 7:
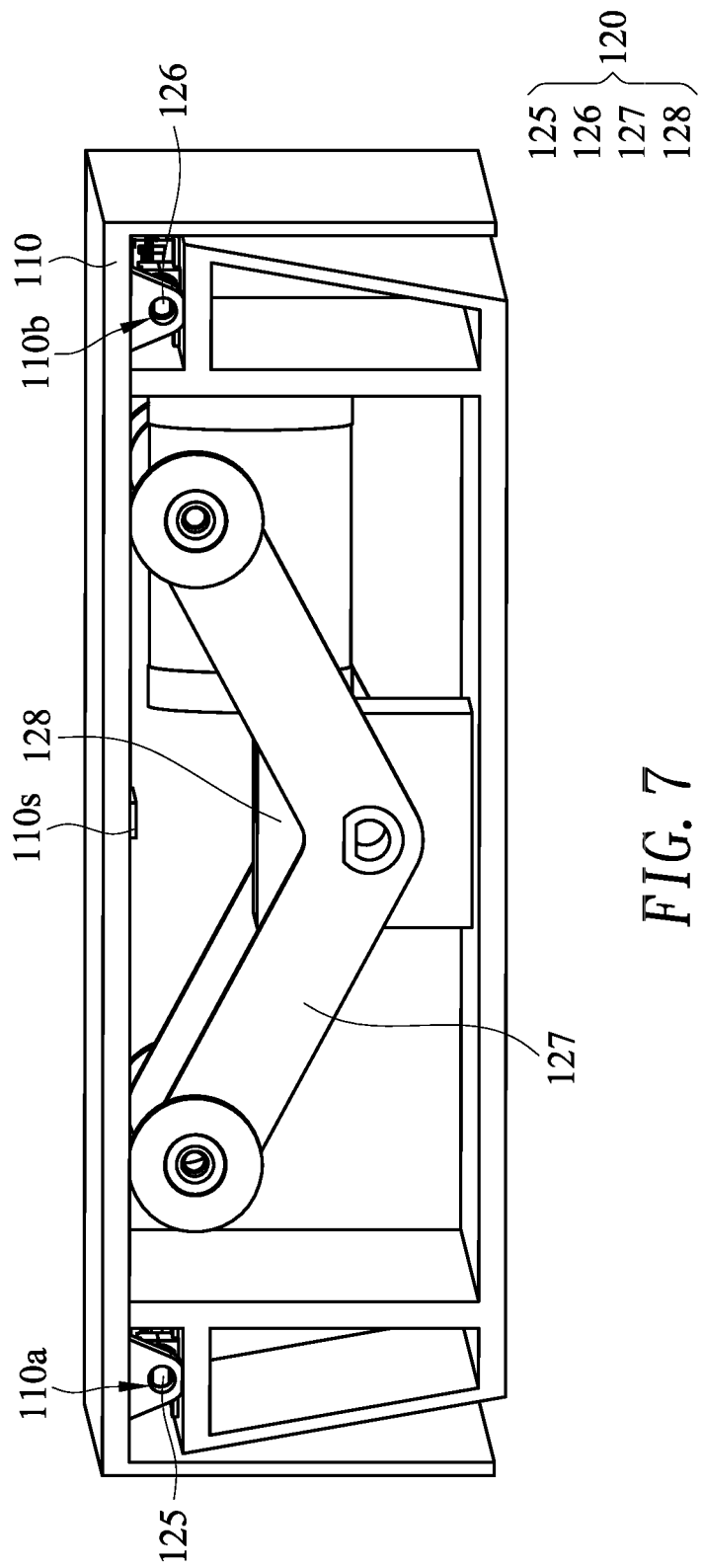
FIG. 7 is a perspective view of a carrier control module according to another embodiment of the present invention.

FIG. 7 is a perspective view of a carrier control module according to another embodiment of the present invention. In some embodiments, the actuating mechanism includes a first rotating shaft 125, a second rotating shaft 126, a V-shaped piece 127 and an actuator 128. The first rotating shaft 125 is configured to pivoted or unpivoted to a first pivot hole 110a of one end of the carrier 110. The second rotating shaft 126 is configured to pivoted or unpivoted to a second pivot hole 110b of another end of the carrier 110 opposite to the end. The V-shaped piece 127 is between the first rotating shaft 125 and the second rotating shaft 126, and two ends of the V-shaped piece 127 are in contact with a first region (not labeled) and a second region (not labeled) of the carrier 110, respectively. The actuator 128 is pivotally connected to the V-shaped piece 127. When the tilt angle of the carrier 110 is non-zero or reaches the non-zero preset value, one of the first rotating shaft 125 and the second rotating shaft 126 is in a pivoted state, and the other thereof is in an unpivoted state, and the actuator 128 rotates the V-shaped piece 127 to drive the carrier to rotate along the one of the first rotating shaft 125 and the second rotating shaft 126 (i.e., the first rotating shaft 125 or the second rotating shaft which is in the pivoted state), so that one end of the V-shaped piece 127 lifts the first region or the second region with which it is in contact so as to reduce the tilt angle of the carrier 110 or make it horizontal.

In some embodiments, two ends of the first rotating shaft 125 are respectively pivotally connected to two first pivot holes 110a (FIG. 7 only shows a single first pivot hole 110a); two ends of the second rotating shaft 126 are respectively pivotally connected to two second pivot holes 110b (FIG. 7 only shows a single second pivot hole 110b). In some embodiments, the actuating mechanism includes two V-shaped pieces 127, and the actuator 128 is between the two V-shaped pieces 127 and is pivotally connected to the two V-shaped pieces 127.

However, the above are only the preferred embodiments of the present invention, and should not be used to limit the scope of implementation of the present invention, that is, simple equivalent changes and modifications made in accordance with claims and description of the present invention are still within the scope of the present invention. In addition, any embodiment of the present invention or claim does not need to achieve all the objectives or advantages disclosed in the present invention. In addition, the abstract and the title are not intended to limit the scope of claims of the present invention.

What is claimed is:

1. A carrier control module, comprising:
   a carrier, configured to couple to a mobile vehicle and having a leveling sensor;
   an actuating mechanism, disposed beneath the carrier and connected or coupled to a first region and a second region of the carrier, wherein the leveling sensor is configured to sense a tilt angle of the carrier, and when the tilt angle of the carrier is non-zero or reaches a non-zero preset value, the actuating mechanism is actuated to adjust an attitude of the carrier so that the tilt angle of the carrier becomes smaller or zero, wherein the actuating mechanism comprises:
   two locking/unlocking assemblies, respectively connected or coupled to the first region and the second region of the carrier; and
   an actuator, having two ends respectively pivotally connected to the two locking/unlocking assemblies, wherein when the tilt angle of the carrier is non-zero or reaches the non-zero preset value, one of the two locking/unlocking assemblies is in an unlocked state, and the other thereof is in a locked state, and the actuator is pushed toward the one of the two locking/unlocking assemblies to lift the first region or the second region to which it is connected or coupled.

2. The carrier control module of claim 1, wherein the actuating mechanism is actuated to restore the attitude of the carrier in a real-time adjustment manner.

\* \* \* \* \*